(12) United States Patent  
Boyer

(10) Patent No.: US 7,913,826 B2  
(45) Date of Patent: Mar. 29, 2011

(54) ELECTRONICALLY CONTROLLED FLUID COUPLING DEVICE WITH FLUID SCAVENGE CONTROL AND CHECK VALVE

(75) Inventor: Rick L. Boyer, Marshall, MI (US)

(73) Assignee: Borg Warner Inc., Auburn Hills, MI (US)

( * ) Notice: Subject to any disclaimer, the term of this patent is extended or adjusted under 35 U.S.C. 154(b) by 609 days.

(21) Appl. No.: 11/868,458

(22) Filed: Oct. 5, 2007

(65) Prior Publication Data

US 2008/0023290 A1   Jan. 31, 2008

Related U.S. Application Data

(63) Continuation-in-part of application No. 11/427,153, filed on Jun. 28, 2006, now Pat. No. 7,278,524, which is a continuation of application No. 10/929,801, filed on Aug. 30, 2004, now Pat. No. 7,083,032.

(51) Int. Cl.  
*F16D 35/02* (2006.01)  
*F16K 31/08* (2006.01)

(52) U.S. Cl. .................. 192/58.61; 192/58.62; 192/58.8

(58) Field of Classification Search ............... 192/58.61, 192/58.62  
See application file for complete search history.

(56) References Cited

U.S. PATENT DOCUMENTS 5,560,462 A * 10/1996 Gustin ........................ 192/58.42  
5,937,979 A *  8/1999 Cummings ................. 192/58.42  
6,021,747 A *  2/2000 Gee et al. ................... 192/58.61

\* cited by examiner

*Primary Examiner* — Rodney H Bonck

(57) ABSTRACT

A viscous fan drive with a front-mounted fan and electrical actuation without a tethered harness. The mechanical package includes an inverted viscous clutch, a drive pulley, a split electromagnetic actuator with the electrical portion mounted to a stationary mounting member, and anti-drainback check valve.

11 Claims, 7 Drawing Sheets

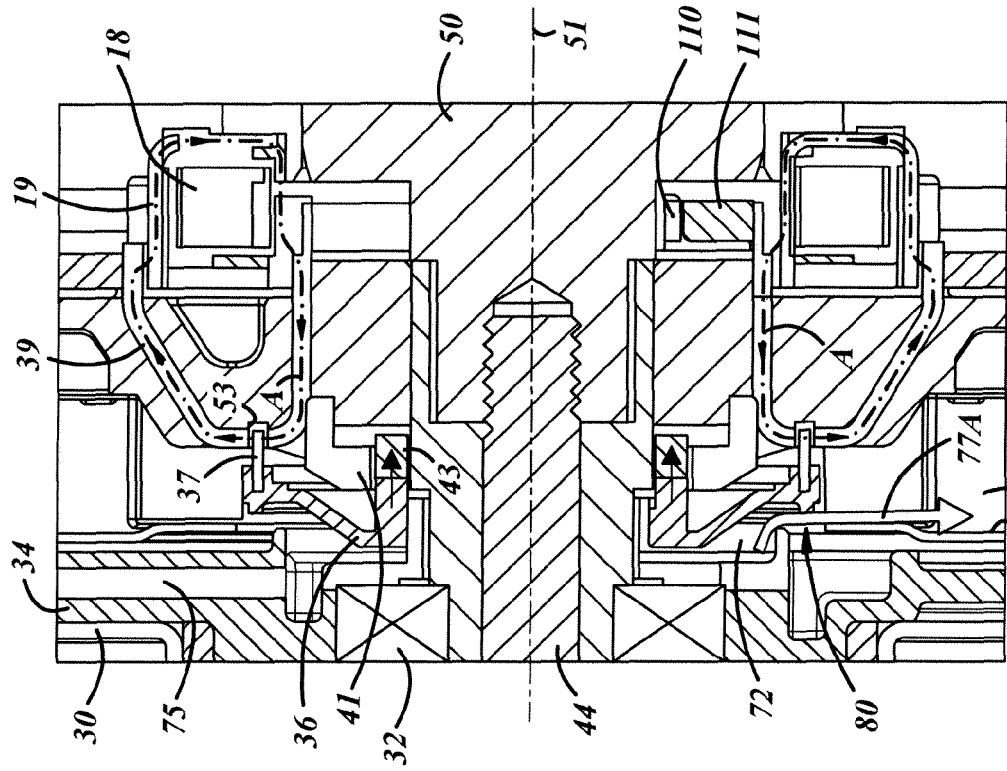
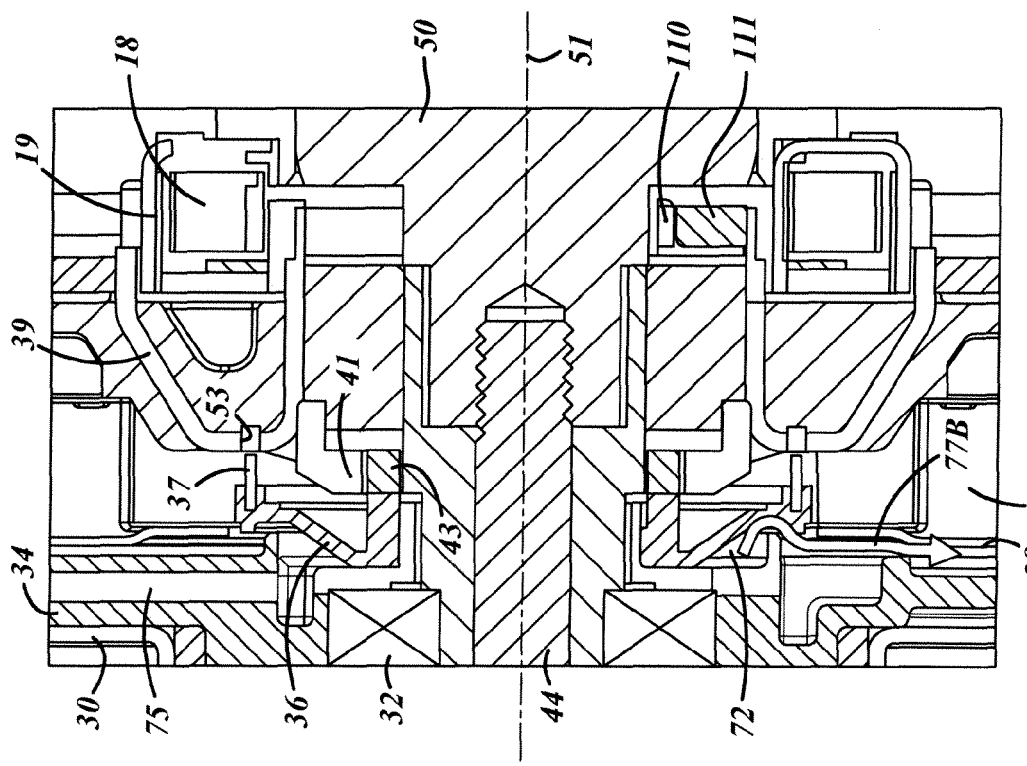
FIG. 4B
FIG. 4A

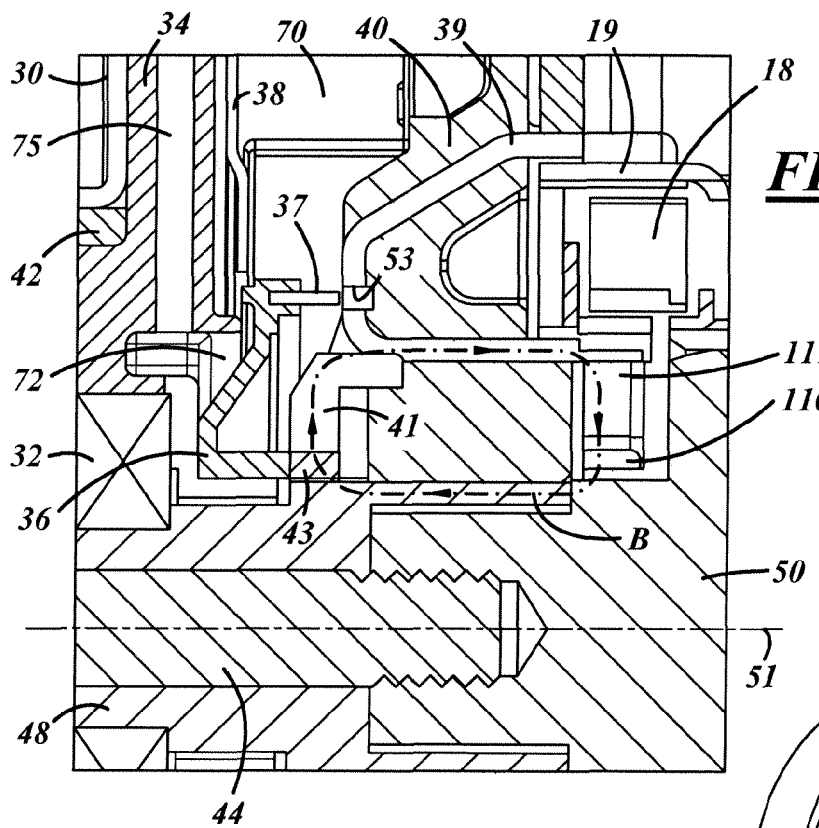
*FIG. 5A*
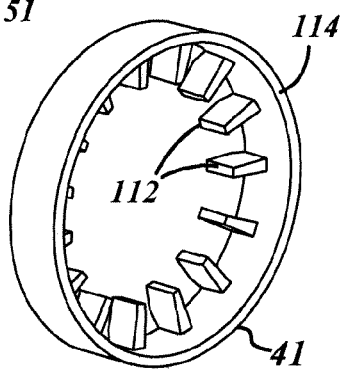
*FIG. 5C*
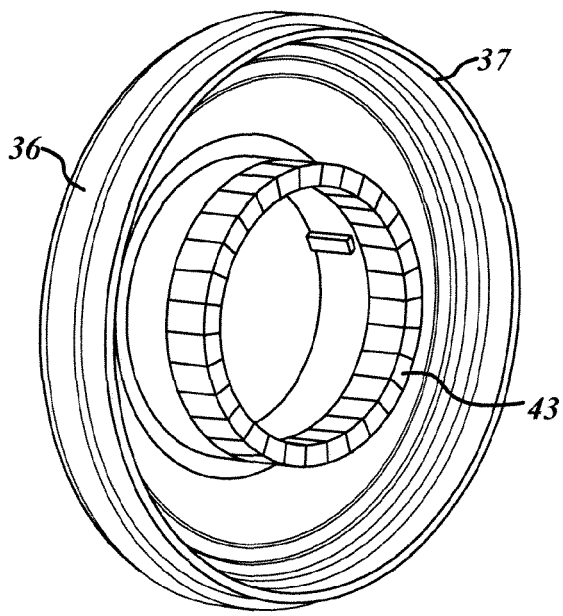
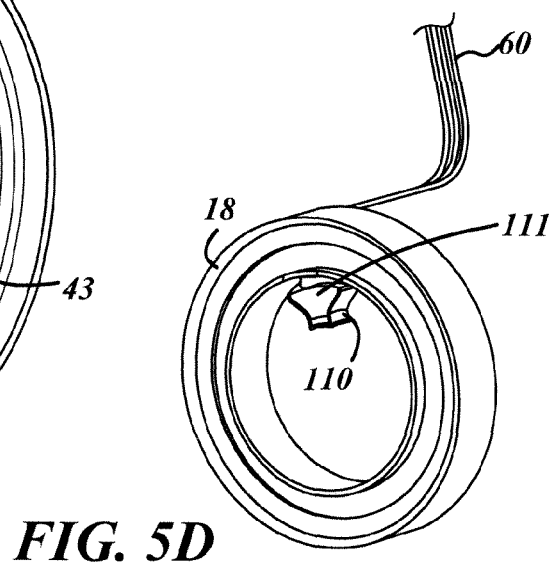
*FIG. 5B*      *FIG. 5D*

ELECTRONICALLY CONTROLLED FLUID COUPLING DEVICE WITH FLUID SCAVENGE CONTROL AND CHECK VALVE

RELATED APPLICATION

The present application is a continuation-in-part of U.S. patent application Ser. No. 11/427,153, filed on Jun. 28, 2006, now U.S. Pat. No. 7,278,524 which in turn is a continuation of U.S. patent application Ser. No. 10/929,801, filed on Aug. 30, 2004, and now U.S. Pat. No. 7,083,032.

TECHNICAL FIELD

The present invention relates generally to viscous fan drive systems, and more specifically to electronically controlled fluid coupling devices for fan drive systems.

BACKGROUND OF THE INVENTION

The present invention relates to fluid coupling devices, particularly of the type having both a fluid operating chamber and a fluid reservoir chamber, as well as valving which controls the quantity of viscous fluid in the operating chamber.

Although the present invention may be used advantageously in fluid coupling devices having various configurations and applications, it is especially advantageous in a coupling device of the type used to drive a radiator cooling fan of an internal combustion engine, and will be described in connection herewith. It is to be understood, however, that the present invention can be used with other accessories or components and in industrial applications, rather than just with vehicles, such as automobiles and trucks.

Fluid coupling devices of the viscous clutch type, have been used for many years for driving engine cooling fans (thus called "fan drives"). Such fan drives can result in substantial savings of engine horsepower and thus can increase the amount of miles of travel that the vehicle can achieve per gallon of fuel. The typical fluid coupling device operates in the engaged, relatively higher speed condition only when cooling is needed, and operates in a disengaged, relatively lower speed condition when little or no cooling is required.

Electrically activated viscous fan drives are known and used today because they can be precisely controlled between an engaged, partially engaged, and disengaged mode to control output at a given fan speed as determined by the vehicle's engine computer.

The electrically actuated viscous fan drives in use today have the actuator mounted to either the front or rear sides of the fan drives. In both cases, the actuators are mounted to the drives with ball bearings and the electrical wires are tethered to a stationary location on the engine or shroud or whatever optimum location is appropriate for the particular vehicle or customer application.

For front-mounted actuators the length of the electrical tether (wire harness) is a limiting factor for large fan applications. For rear—mounted actuators, the axle length can limit usage in narrow package applications. In addition, they also require a tether (wire harness) from the fan drive to a stationary location that can be difficult to install in the vehicle if the fan is assembled to the fan drive before installation. The durability of either design is a function of the bearing life as well as the durability and life of the tethered electrical wires and/or brackets.

Thus, a fan drive without a tether, that is without electrical wires tethered to a stationary location, and without actuators mounted to ball bearings, could improve the durability of the fan drive, as well as lower the cost of the fluid coupling drive. It is also important, however, that the tetherless fan drive maintain the same or similar fan drive performance characteristics and attributes as the tethered fan drive.

The front-mounted electrical actuator fan drive was the result of an evolution of earlier air-actuated viscous fan drives used in heavy truck and large bus applications. Initially, bi-metal control spring members and mechanisms were utilized on the front of the viscous drives. These were subsequently replaced by bearing-mounted pneumatic solenoids. Durability issues with the tethers and higher fuel economy requirements demanded by the public and government entities forced the heavy-duty industry to switch to pneumatic on/off friction clutches without a tether. In these clutches, the air supply was supplied through the center of the mounting brackets—pulley subassembly.

Today, the automotive and heavy-duty industry is facing even stiffer fuel economy restrictions, as well as noise control requirements. These continue the need for variable speed or at least multi-speed fan drives. As a result, viscous drives are economical and durable solutions that have evolved to the use of rear-actuated viscous fan drives. These rear-mounted electrically controlled actuators were developed to reduce potential tether durability problems associated with front-mounted style actuators.

Front actuated viscous fan drives continued to be used for light to medium duty applications because the axial length and cost are better than rear actuated fan drives. However, in some light duty gasoline engine applications where the fan clutch is driven by the water pump, a system resonant problem exists caused by numerous factors including the mass center of gravity (CG) of the fan drive.

Thus, a new and improved viscous fan drive is needed for numerous applications, whether for light, medium duty or heavy vehicle usage. In addition, the need exists for actuators having reduced costs, improved durability, and better noise and vibration performance.

SUMMARY OF THE INVENTION

The present invention is intended to minimize the aforementioned problems and concerns with tethered actuators and system resonance issues while incorporating desirable features, such as a high-speed reservoir, and a combined "failsafe" and anti-drain back option. The invention also utilizes a scavenge control valve configured on a low speed member which performs as a fluid flow diverter.

The present invention provides a viscous fan drive with a front-mounted fan and electrical actuation without a tethered harness. The present invention utilizes an inverted viscous clutch, a drive pulley, and a split electromagnetic actuator resulting in a purely mechanical package that provides several advantages over existing engine-driven electronically managed viscous fan drives. An inverted clutch is one where the conventional clutch is essentially flipped around such that the central shaft is the output shaft while the outer members, such as the body and cover, are the input.

In this configuration, the electrical portion of the actuator is not physically mounted to the fan drive, but rather is mounted to a stationary member at the drive pulley. The stationary member could also be attached to the water pump housing. The remaining actuator components are integral to the fan drive and, as a result, the fan drive itself has only mechanical parts. With the embodiment disclosed in the present application, the bearing location, pulley mounting, clutch mounting, fan mounting, and differential speed sensor magnet are all positioned to optimize performance and application of the viscous fan drive. Embodiments of the invention can use high speed reservoirs with accumulators, scavenge control with a low speed valves, stamped metal covers, and integrated slip speed sensors. The invention allows for fast response times for engagement or disengagement of the clutch and also allows for open-loop control of electrical actuation.

Other benefits, features, and advantages of the present invention will become apparent from the following description of the invention, when viewed together with the accompanying drawings and appended claims.

BRIEF DESCRIPTION OF THE DRAWINGS

FIGS. 4A-4B illustrate the engaged and disengaged positions, respectively, of the valve assembly in accordance with an embodiment of the present invention.

FIGS. 5A-5D illustrate components of a slip speed sensor and the operation thereof in accordance with an embodiment of the present invention.

DESCRIPTION OF PREFERRED EMBODIMENTS

Figure 1:
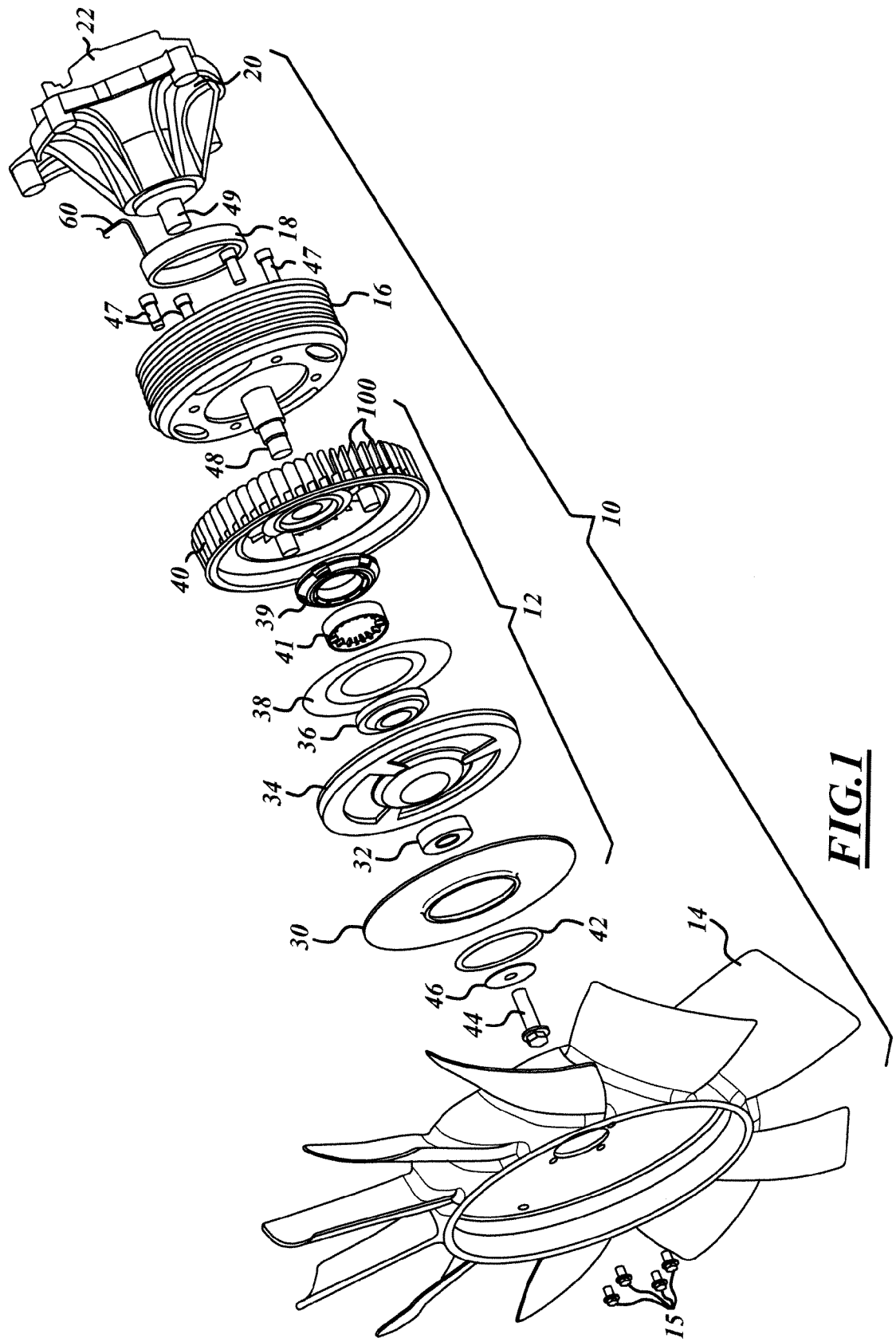
FIG. 1 an exploded view of an embodiment of the present invention.
Figure 2:
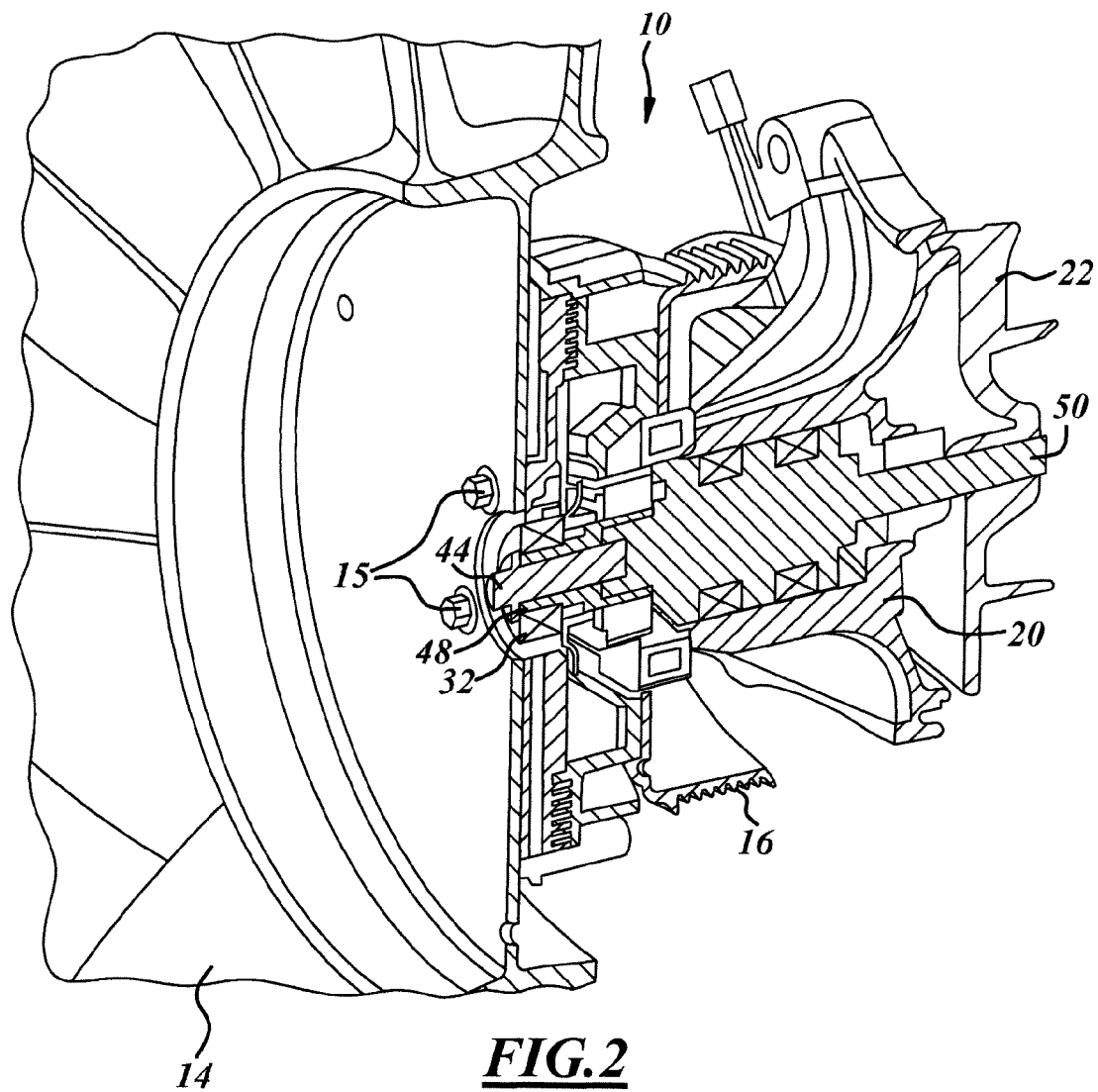
FIG. 2 is a perspective partial cross-sectional view of a viscous fan drive in accordance with an embodiment of the present invention.
Figure 3:
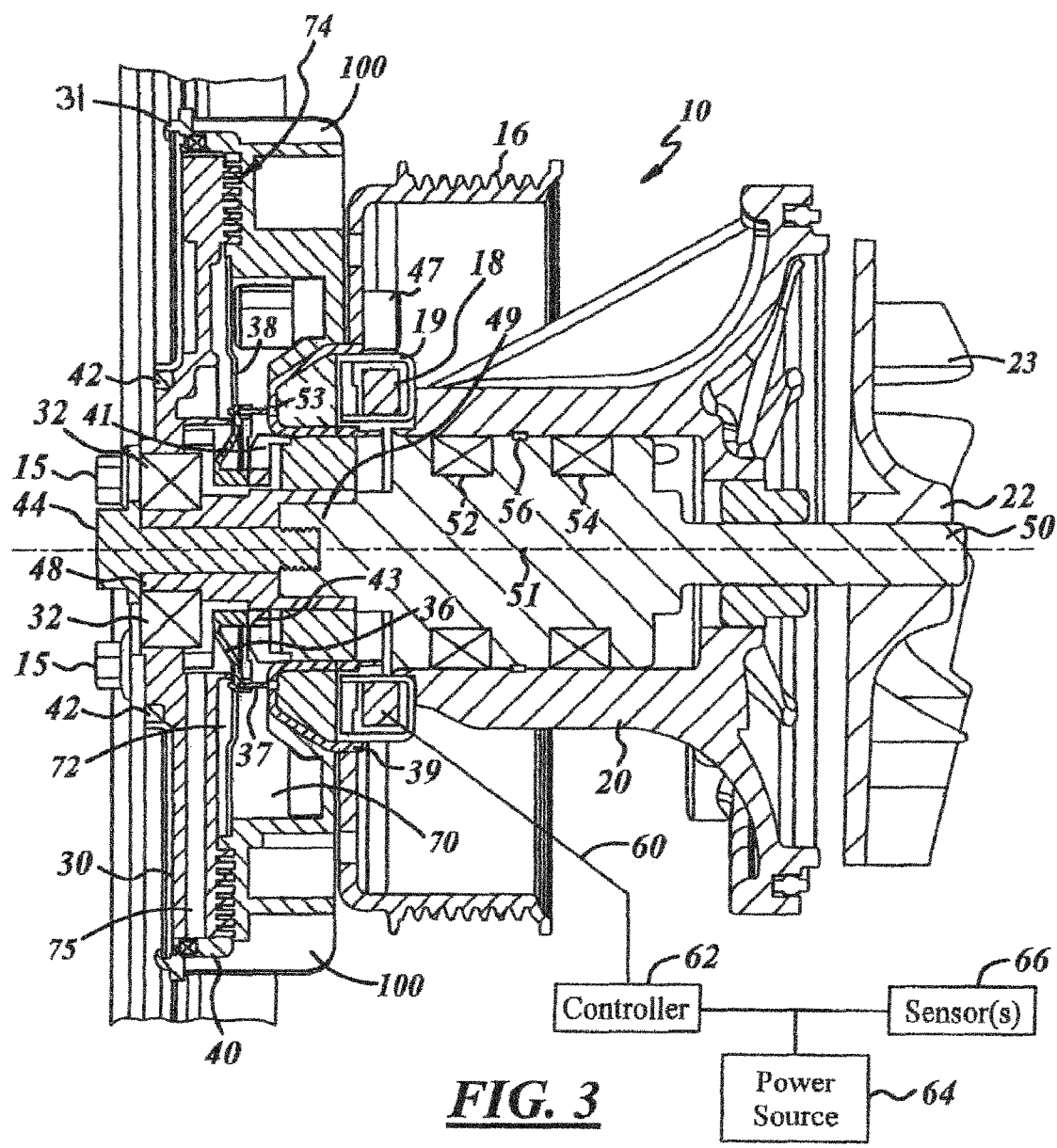
FIG. 3 is a cross-sectional view of an embodiment of the present invention.

Referring now to the drawings, which are not intended to limit the invention, FIGS. 1-3 illustrate one embodiment of a fluid coupling device 10 ("viscous fan drive") in accordance with the present invention. The device 10 includes a viscous drive mechanism 12 which is utilized to control the speed of rotation of a cooling fan 14. The viscous drive mechanism 12 is attached to a pulley 16 which is operated by a belt (not shown) on the front of a vehicle engine. The fan drive is activated electrically by an electrical coil 18 which is fixedly mounted to a stationary mounting member 20. The mounting member 20 can be a bracket attached to a vehicle engine or the like, or a mounting bracket for a vehicle water pump. A portion of a water pump 22 is shown, for example, in FIGS. 1-3.

The fan member 14 can be any type of fan member known and used today, such as a plastic or metal fan. The fan member 14 is mounted by a plurality of fasteners, such as bolts 15 directly to the rotor member 34 and rotates with it.

The viscous drive mechanism includes a cover plate member 30, a bearing member 32, a rotor member 34, an armature member 36, a reservoir plate member 38 and a body member 40. The body member 40 has a plurality of external fin members 100 which are used to help cool the cover member and the internal components and fluid within the viscous fan drive. The rotor member, reservoir plate member and body member are preferably made from an aluminum material. The cover plate is preferably made from a metal material such as steel and stamped into the configuration shown in the drawings. A stamped steel cover plate is less expensive than a die cast cover member with fins which is conventionally used in viscous fan drives today. The armature member 36 is preferably made from a plastic material.

Also, as shown in FIG. 3, the cover plate member 30 is fixedly secured to the body member 40. This can be accomplished by a portion of the body member being deformed and swaged over the edge of the cover member, as shown by reference number 31. The body member in turn is directly attached to the pulley member 16 by a plurality of bolts or other fasteners 47.

A rotary seal 42 is used to seal the joint between the cover plate member 30 and the body member 40 to prevent leakage of the viscous fluid adjacent the fan member 14.

A mounting bolt 44 together with a washer 46 (also known as "slinger"), are used to mount the viscous drive mechanism 12 and pulley member 16 to the mounting member 20. The mounting bolt 44 fits within a hollow shaft member 48 which is mounted on the end 49 of the rotating shaft 50, which in this example is a water pump shaft.

The shaft 50 is rotatable mounted within the stationary mounting member 20 by bearing members 52 and 54. The mounting bolt 44 is threadedly mounted to the rotating shaft 50 as shown in FIG. 3.

The electromagnetic system utilized with the viscous fan drive mechanism includes a coil 18, along with a steel housing member 19, both of which are mounted to the stationary mounting member 20. The coil 18 has a wire harness 60 that is electrically coupled to a controller 62 and a power source 64. The controller 62 receives electrical signals from a plurality of engine sensors 66 regarding engine and vehicle operating conditions. The operating conditions could be engine temperature, fuel economy, emissions or other engine operating conditions affecting the performance of the engine. For example, one of the sensors 66 could be an engine mounted coolant sensor or a pressure sensor mounted to the air conditioner. The controller 62 has a stored look-up table that determines a desired engine operating range for a given engine speed. When the controller 62 determines that one of more of the sensors 66 are sensing cooling conditions outside the desired operating range, the external controller 62 will direct the power source 64 to send electrical power to the coil 18 as a function of this electrical signal. Thus, for example, if the external controller 62 determines that the engine coolant temperature is too low, or that the engine temperature is too low, a signal may be sent from the controller 62 to the power source 64 to activate the coil 18 to its desired pulse width, therein providing a magnetic field within the fluid coupling device 10.

Similarly, if the external controller 62 determines from one or more of the sensors 66 that the engine, or engine coolant temperature, is above an undesired high range, no signal is sent to the external controller 62 to the power source 64 and coil 18. Thus, in this manner, the controller 62 interprets the signals from the sensor to direct the power source 64 to send or not send electrical current to the coil 18 via the wire harness 60 to control the output from the viscous fan drive 10 in a manner described herein.

As indicated, the stationary mounting member 20 can include a water pump shaft 50 mounted directly to an engine block (not shown) near the crank shaft pulley (not shown) using bolts or other conventional fasteners. In an alternative embodiment (not shown), the water pump mounting bracket can be a stand-alone bracket-pulley subassembly. The water pump shaft 50 is coupled to a plurality of impellers 23 used to control engine coolant flow within an engine cooling system to cool the engine. The water pump shaft 50 is mounted to the pulley 16 through the hollow shaft member 48. Thus, the shaft member 50 rotates at the same rotational rate as the pulley 16 to drive the impellers and therein provide coolant flow to the engine.

As indicated, the pulley 16 is coupled to the engine crankshaft by a drive belt (not shown) and rotates the body member 40 at a rate determined by the engine operating speed translated to the pulley 16 through the crankshaft and belt. The body member 40, which is preferably made from a die cast aluminum material, has an overlying region 31 that is used to hold the stamped cover plate member 30 fixedly in place in the viscous fan drive. Thus, the body member 40 and the cover plate 30 rotate at the same rotational rate as the pulley member 16.

The fan member 14 is rotatably mounted within the viscous fan drive using the ball bearing member 32 and is fixed to the rotor member 34. The rotor member and fan member thus comprise the output of the viscous fan drive.

The volume of space around the rotor member 34 and bounded by the cover 30 and body member 40 defines a fluid reservoir 70 in which a quantity of viscous fluid is provided (not shown). The cover member 30 and reservoir plate 38 define a fluid chamber 72. The volume of space between the radially outer portion of the rotor member 34 and the body member 40 defines the fluid working chamber 74 for the viscous fan drive.

The fluid reservoir 70 is fluidically coupled with the fluid chamber upon movement of the armature member 36 in a manner to be described below. The axial movement of the armature member opens and closes a scavenge fluid flow path depending upon actuation of the electrical coil 18 which controls the flow of fluid between the fluid reservoir and fluid chamber. In addition, the fluid chamber 72 is fluidically coupled to a working chamber 74 which is defined between the outer ends of the rotor member in combination with the body member 40 and cover member 30 in a conventional manner. The amount of viscous fluid contained in the working chamber 74, in conjunction with the rotational speed of the cover and body members coupled to the pulley member 16, determines the torque transmitted to the rotor member 34 that rotates the fan member 14. In other words, the torque response is a result of viscous shear within the working chamber 74. Thus, as indicated, the rotation of the fan member is used to cool the radiator or other engine components as required by the engine controller and the appropriate sensors.

The armature member 36 is preferably made from a plastic material and has a metal armature ring 37 attached to its outside circumference. (This is better shown in FIG. 5B.) The armature ring 37 is made from a ferrous material. In addition, a multi-pole ring magnet 43 is attached to and part of the armature member 36. The armature ring and multi-pole ring magnet act in combination with the electromagnetic circuitry caused by the coil member 18 to move the armature member in an axial direction along the longitudinal axis of the viscous fan drive system. In this regard, the longitudinal axis is indicated by the centerline 51 (FIGS. 3, 4A, 4B and 5A).

The hub member 39 is made from a ferrous or metal material and is insert cast molded into the body member 40. The hub member has a conical shape with a U-shaped cross-section as shown, in particular, in FIGS. 3 and 4A-4B. After the body member is cast with the hub member in it, an annular channel 53 is formed in the hub member. The channel 53 is in axial alignment with the armature ring 37 on the armature member 36. The space formed by the annular channel 53 provides a working gap in which the armature ring is pulled into and positioned upon actuation of the electromagnetic system in accordance with the present invention.

The armature member 36 is essentially a valve member and operates to open and close the scavenge fluid flow path of the viscous clutch mechanism. This is shown more particularly in FIGS. 4A and 4B. FIG. 4A depicts the valve member in the engaged position and FIG. 4B illustrates the valve member in the disengaged position. In the disengaged position, an opening 80 is provided between the armature member 36 and the reservoir plate member 38 allowing the scavenge fluid flow path to open and the viscous fluid 77A to flow back into the reservoir chamber 70. This disengages the fan member. In the engaged position, the working chamber 74 is filled with viscous fluid and the output members, namely the rotor member 24 and fan member 14, are rotating at full speed or capacity and providing full cooling to the radiator or other engine accessories as needed. In this operational position, the opening 80 is closed and the viscous fluid 77B which is scavenged from the working chamber 74 through scavenge channel 75 to the fluid chamber 72 is recirculated to the working chamber 74.

As a result of the manner in which the fan member is engaged and disengaged, the viscous fan drive is normally in the "on" position. This is known as the "failsafe" condition. In addition, the amount by which the armature member 36 is moved axially and the corresponding amount that the opening 80 is opened regulates the amount of viscous fluid which is returned to the fluid reservoir and the amount which is recirculated to the working chamber. This regulates the speed of the fan member. Thus, with the present invention, the fan member can be in the "on" condition, the "off" condition, and at any rotational speed between those two conditions.

It is also possible with an alternate embodiment of the present invention to provide a viscous fan drive which is always in the "off" position and the fan member is only engaged when electrical power is provided and the electromagnetic circuitry is activated. This could be provided with the same structure and components as the failsafe embodiment, but would entail a modification of the programming in the controller 62.

As indicated, the rotor member 34 has a scavenge tunnel 75 which operates in the same manner as scavenge tunnels with rotor members of conventional viscous fan drives and provides a return path for the viscous fluid from the working chamber back into the fluid chamber and/or fluid reservoir.

The flux path for the electromagnetic circuitry is shown by arrows A in FIG. 4B. The flux path A includes the ferrous hub member 39 and the ferrous housing member 19. As indicated, when the sensors 66 indicate to the controller 62 that the rotation of the fan member is not desired or not desired to the same extent, then the coil member 18 is actuated. The actuation of the coil member creates the flux path A, which due to the multi-pole ring magnet 43, moves the armature member axially and positions the armature ring 37 into the channel (or "working gap") 53.

The present invention has numerous advantages over other viscous fluid fan drive mechanisms and systems. Without the tethered wire harness, there are fewer electrical inner connections necessary. Also, the coil member and electrical circuitry is more easily serviceable. The slip heat capacity is improved due to the rotation of the cover member with its cooling fins at input speed which also provides additional fluid reservoir cooling. The invention also has a failsafe mode and is normally in the engaged or "on" condition and also has a quiet startup. The reaction time for the pump out and fill of the working chamber are improved since the scavenge rate is independent of the fill rate.

The scavenge flow control valve is also part of the output member which thus reduces dynamic loading effects on the valve member. The invention also enables "smart" controller integration since the electronics are not physically connected to the fan drive.

The invention also has a smaller number of components then tethered viscous fan drives. The present invention has as much as 30 percent fewer components than corresponding tethered viscous fan drives, either front mounted or rear mounted. This provides lower cost and improved reliability of the viscous fan drive mechanism and system. Also, warranty costs could be reduced since the electronic components are more serviceable and fewer components are needed.

The viscous fan drive mechanism in accordance with the present invention is also easier to assemble to the vehicle. Further, with the present invention, the axial length of the viscous fan drive mechanism is reduced, as much as 50-60 millimeters. This can be important in vehicles which have limited space in the engine compartment. In addition, the scavenge control utilizes a low speed valve mechanism which is a benefit and improvement over prior viscous fan drive systems.

One embodiment of the present invention also utilizes an integrated slip speed sensor. A preferred sensor of this type is shown, for example, in U.S. Patent Application Ser. No. 60/806,638, filed Jul. 6, 2006, the disclosure of which is hereby incorporated herein by reference. The integrated slip speed sensor monitors the clutch output speed with an electromagnetic circuit partially comprised of components common with the clutch. The circuit configuration provides a speed sensor that measures the speed differential between the clutch output and the clutch input. When measured by the heat controller (or a remote computer), the differential speed is subtracted from the clutch input speed to determine the output speed.

For the electromagnetic circuit, a sensor pole member 41 is provided, along with a Hall Effect Device (HED) 110, or another magnetic sensing device. The HED 110 is positioned on the end of a flux concentrator 111 which is attached to the coil member 18. There are shown more particularly in FIGS. 5C and 5D, in combination with FIG. 5A which depicts the flux path B of the slip speed sensor system. The pole member 41 has a plurality of magnetic poles 112 arranged circumferentially around the inside of an outer ring 114. The flux path B includes the HED sensor 110, the hollow shaft member 48, the ring magnet 43, the pole member 41 and the hub member 39.

The pole member 41 rotates at input speed relative to the stationary HED 110. The alternating poles of the ring magnet 43 create alternating directions of the magnetic flux in the magnetic circuit proportional to the differential speed of the input and output. The differential speed is determined by the difference in speed between the pole member 41 and ring magnet 43.

Another feature of one embodiment of the present invention is the improved manner in which the viscous fluid and the viscous valve mechanism is aided in being cooled. As indicated, the body member 40 is a cast metal component, preferably made from an aluminum material, and has a plurality of fin members 100 cast on the outside surface. This is shown in particular in FIG. 7B. In addition, the body member rotates at input speed since it is directly coupled to the pulley member 16. The viscous fluid reservoir in turn rotates at the same input speed. The fluid reservoir is thus similarly connected to the cooling fins of the body member with the present invention and is maintained at a lower temperature by the effect of the cooling fins.

Figure 7A:
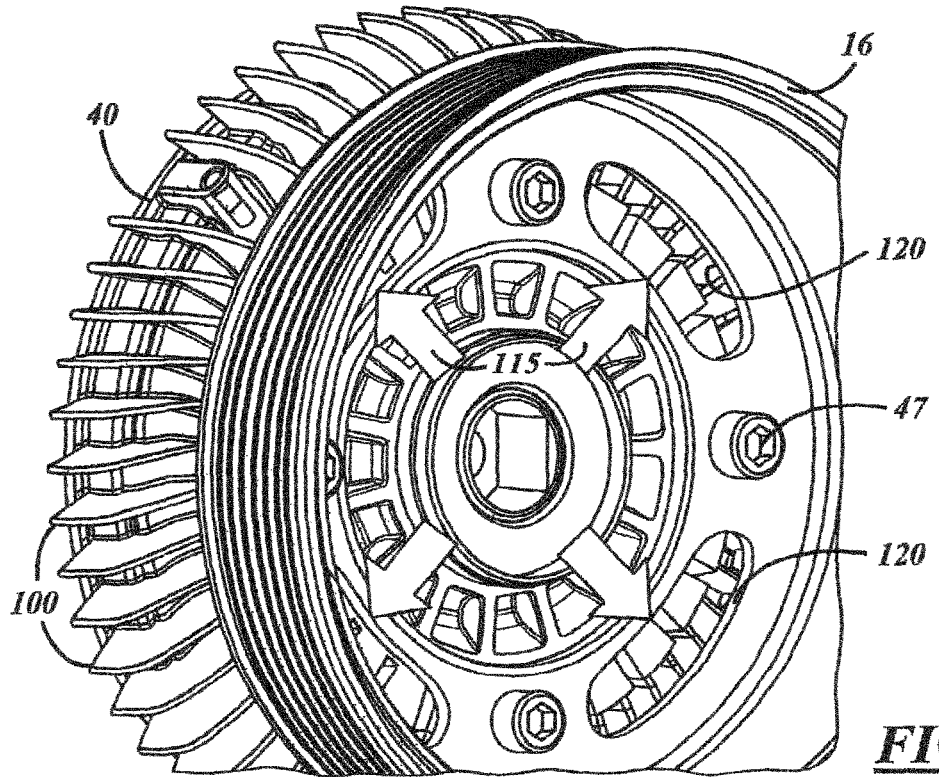
FIG. 7A-7C illustrates another embodiment for aiding the cooling of a fan drive system in accordance with an embodiment of the present invention.

A plurality of openings 120, called "breather" openings, in the pulley member, as shown in FIG. 7A, assist in allowing air flow to more easily pass over the cooling fins. As shown in FIG. 7A, four enlarged openings 120 are provided and the air flow is depicted by arrows 115. It is understood that any size and number of openings can be provided, however, so long as the strength and durability of the pulley member are not compromised. Also, the larger the openings or the larger area of open space in the pulley member, the greater the cooling effect.

Figure 7B:
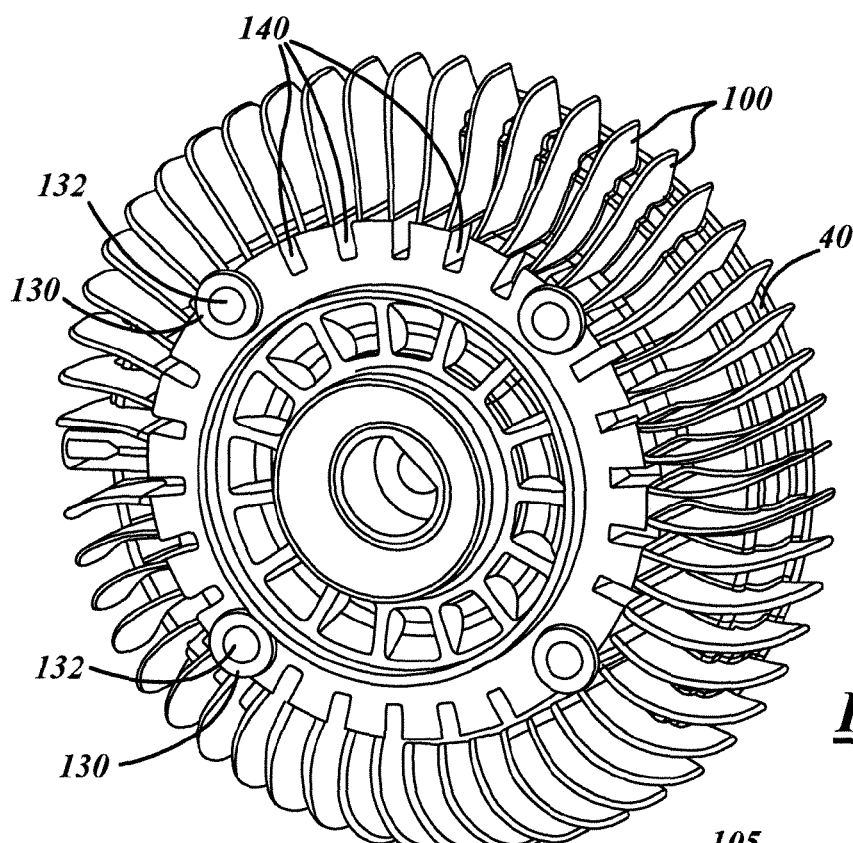

In addition, in order to space the pulley member 16 from the body member 40 and to minimize conduction of heat from the body member to the pulley member, raised bosses 130 are provided at each of the mounting openings 132 where the pulley member is attached to the body member by bolts 47 or other fasteners. This is shown in FIG. 7B. This minimizes the conduction of heat from the body member to the pulley member and vice versa.

In addition, as also shown in FIG. 7B, a plurality of grooves or slots 140, also called "breather" slots, are provided on the outside surface of the body member 40 aid in allowing air flow over the cooling fins 100. The air flow passes through the breather openings 120 in the pulley 16 and through the breather slots 140 in the body member 40. This allows the air flow to contact more of the surface of the cooling fins 100, thus aiding in cooling.

Figure 7C:
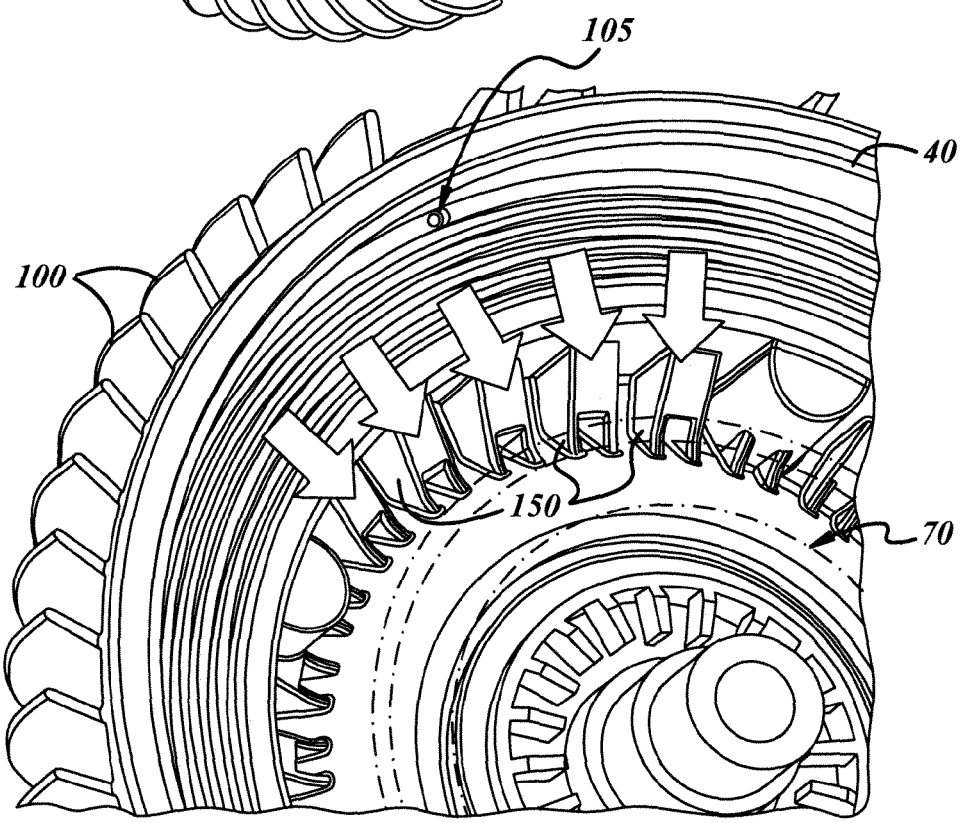

In addition, as shown in FIG. 7C, a number of fin members 150 are provided inside the reservoir chamber 70. The fin members 150 can be formed and provided by the breather slots 140 in the exterior surface of the body member 40. The fins 150 inside the viscous fluid reservoir also aid in the heat transfer of heat from the viscous fluid to the cooling fins 100 and thus to the atmosphere inside the engine compartment of the vehicle.

Figure 6:
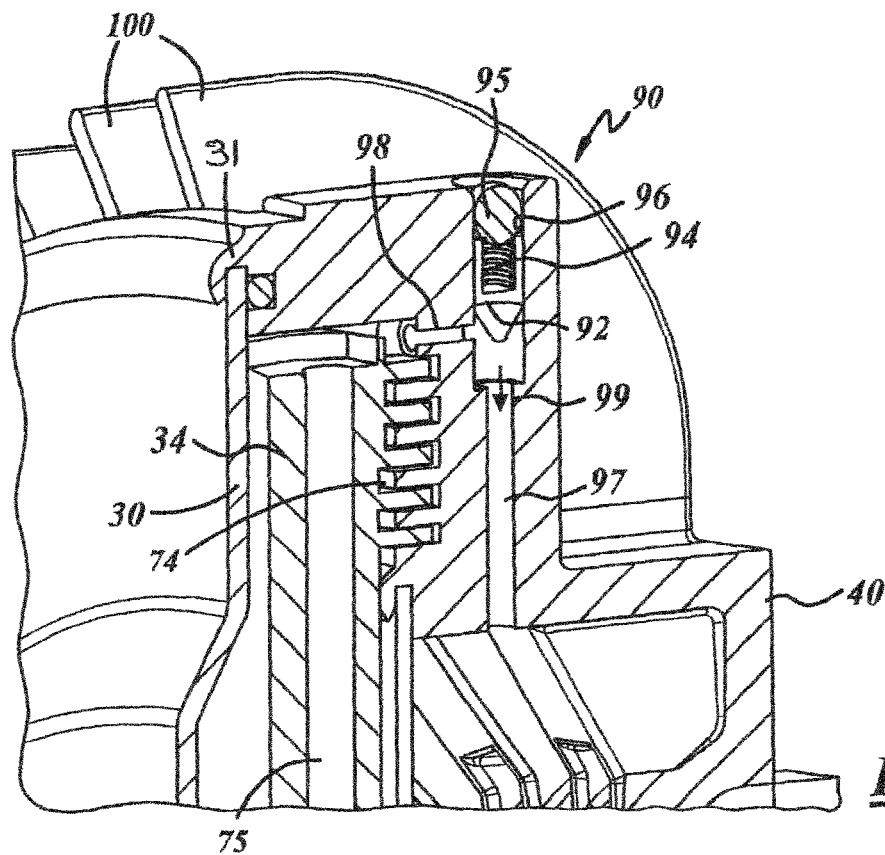
FIG. 6 is a schematic illustration of a check valve mechanism which can be used with an embodiment of the present invention.

Another feature of the inventive viscous fan drive system is shown in FIG. 6. In this embodiment, a check valve 90 can be utilized. The check valve 90 prevents drain back and reduces residual channel fluid. The check valve has a spring actuated piston member 92 biased by spring member 94 against a plug member 95. The plug member 95 is positioned in the channel or bore 96 (after the bore is formed) in order to hold the piston member and spring member in position. The channel member 96 has associated secondary scavenge channel member 97 which is in direct communication with the reservoir chamber 70. The channel 96 also has an associated channel member or passageway 98 which is in direct communication with the working chamber 74. The check valve mechanism 90 improves the response and controllability of the viscous fan drive. It provides a shorter fill path which improves controllability due to reduced fluid fill lag time. The wiper is essentially "inverted" and improves the fill rate as well. The check valve mechanism 90 prevents drain back and reduces residual channel fluid.

In operation, with a check valve mechanism 90 positioned in the body member 40 which is rotating at input speed, the centrifugal force on the piston member 92 forces the piston member outwardly against the plug member 95 and against the force of the spring member 94. In this condition, there is a direct flow path through channel members 98 and 97 from the working chamber to the fluid reservoir. Thus, when the viscous drive mechanism is in the engaged position and the fan member is rotating, there is a continuous flow of fluid from the reservoir to the working chamber and back to the reservoir.

When the engine is turned off or not in operation, the spring member 94 biases the piston member 92 in a radially inward position as shown by arrow member 99 in FIG. 6. The piston member 92 closes the end of the channel or passageway 98 thus preventing the viscous fluid from draining from the fluid reservoir into the working chamber. This aids in providing a quieter startup of the engine.

With fewer components, the viscous fan drive in accordance with the present invention has less weight and less overhanging mass. The lighter weight can help improve fuel economy of the vehicle, while the less mass that overhangs the mounting member can improve the durability of the bearings and shaft member for the water pump or other associated component.

The rotor member 34 also includes a scavenge system that returns viscous fluid from the working chamber to the reservoir chamber in a conventional manner. Disposed adjacent the radially outer periphery of the working chamber is a pumping element also referred to as a "wiper" element (see 105 in FIG. 7C). The wiper element operates to engage a relatively rotating fluid in the operating chamber and generate a localized region of relatively higher fluid pressure. As a result, a small quantity of fluid is continuously pumped from the working chamber back into the reservoir chamber through a scavenge channel, such as channel 75 in the drawings.

The amount of electrical power supplied in terms of pulse width modulation from the external controller 62 and power source 64 enhance the amount of magnetic flux available to control the relative positioning of the axially movable armature valve member 36. As indicated, the controller receives a set of electrical inputs from various engine sensors 66 that monitor various engine operating conditions. The lookup table in the controller determines a desired engine operating range for a given engine speed. When input from one of the sensors to the controller indicates that cooling conditions are outside the desired operating range, the external controller 62 will direct the power source 64 to send electrical power to the coil member 18 as a function of this electrical signal. Thus, for example, if the armature member is pulled or moved axially, a gap is opened between the armature member 36 and the reservoir plate 38 allowing viscous fluid to return to the reservoir 70. This in turn reduces the amount of viscous fluid in the working chamber. Hence, a fan coupled to the output member would rotate slower.

Similarly, if the external controller 62 determines from one or more of the sensors 66 that the engine, or engine coolant temperature, is above an undesired high range, no signal is sent from the external controller 62 to the power source 64 and coil 18. The armature valve member 36 is thus maintained in a position wherein the gap 80 is closed allowing maximum fluid flow from the fluid reservoir 70 to the fluid chamber 72 and to the working chamber 74. This provides maximum torque response of the rotor 34 which in turn rotates the fan member 14 to provide maximum cooling to the radiator to cool the engine coolant.

The present invention provides numerous advantages over currently available front and rear actuated viscous fan drives. For example, the electrical portion of the actuator is not physically attached to the fan drive, but rather is mounted to a stationary member of the drive pulley. As such, there is no tethered wire harness and no actuator bearing. This leads to easier and less costly manufacturing, as there are no wires or connectors. Further, the coil is easily replaced, which lowers service and warranty costs.

Further, the remaining actuator components are integral with the engine side of the fan drive. This leads to lower overhanging mass on the drive components, which leads to higher system resonant frequency and possible improvements in waterpump or component durability. This also leads to compact packaging, which can improve vehicle costs.

Finally, in another embodiment, the amount of pulse width modulation to said electrical coil could be such to generate a magnetic field in which the armature valve member 36 partially covers the gap 80. The magnetic field generated would be less than the magnetic field necessary to axially translate the armature valve member completely to the second position completely opening the annular gap 80. This position would allow partial engagement of said rotor 34 and output at an infinite number of midlevel outputs to more precisely control the amount of cooling available to the radiator.

While preferred embodiments of the present invention have been shown and described herein, numerous variations and alternative embodiments will occur to those skilled in the art. Accordingly, it is intended that the invention is not limited to the preferred embodiments described herein but instead limited to the terms of the appended claims.

What is claimed is:

1. An electronically controlled viscous fluid coupling assembly for a fan comprising:
    (a) an output member configured for attachment to a fan;
    (b) an input member bearing mounted to said output member and rotatable around said output member and at input speed, said input member comprising a body member and a cover member;
    (c) a stationary mounting member bearing coupled to said input member;
    (d) a viscous fluid supply mechanism positioned within said input member and comprising a rotor member having a scavenge passageway, a reservoir plate member having a fluid aperature, a fluid reservoir, a fluid chamber, a working chamber and a quantity of viscous fluid;
    (e) an electromagnetic member mounted on said stationary mounting member;
    (f) an electromagnetically actuated valve mechanism for controlling viscous fluid engagement of said output member with said input member, said valve mechanism having a moveable member for opening, partially opening and covering said fluid aperature port responsive to a magnetic field generated by said electromagnetic member; and
    (g) a check valve mechanism in said body member for preventing drain back of viscous fluid;
    (h) said check valve mechanism positioned adjacent said working chamber and in fluid communication with said working chamber and said scavenge passageway;
    wherein controllability and response of the viscous fluid coupling assembly are improved; and
    wherein the operation and the speed of a fan member is controlled by said viscous fluid coupling assembly without a wire tether member.

2. The fluid coupling device of claim 1 further comprising a water pump and wherein said input member is coupled to said water pump and both rotate at the same speed.

3. The fluid coupling device of claim 1 wherein said stationary mounting member is connected to said water pump.

4. The fluid coupling device of claim 1 wherein said check valve mechanism comprises a spring actuated piston member biased to close communication between said working chamber and said scavenge passageway.

5. The fluid coupling device of claim 4 wherein said bias of said spring actuated piston member is adapted to be overcome when said body member is rotated at input speed.

6. The fluid coupling device of claim 1 further comprising a differential speed sensor mechanism for determining the rotational speed of said output member.

7. The fluid coupling device of claim 6 wherein said differential speed sensor comprises a magnetic sensing device coupled to said stationary member, pole member attached to said input member, and a multi-pole magnet member.

8. The fluid coupling device of claim 7 wherein said magnetic sensing device is a Hall Effect Device.

9. The fluid coupling device of claim 7 wherein said pole member comprises plurality of magnetic poles arranged circumferentially around the inside of the ring member.

10. The fluid coupling device of claim 1 wherein said viscous fluid supply mechanism comprises a scavenge flow control mechanism and an axially moveable armature valve member.

11. The fluid coupling device of claim 10 wherein said armature valve member axially moves relative to said reservoir plate member depending on the magnetic field generated by said electromagnetic member in order to open, partially open, or close said fluid aperature in said reservoir plate member.

* * * * *